United States Patent [19]

Anderson

[11] 4,183,268

[45] Jan. 15, 1980

[54] DEVICE FOR REPLACING SPRINGS

[76] Inventor: Jerome E. Anderson, Box 186 E, Rte. #2, Lewes, Del. 19958

[21] Appl. No.: 915,374

[22] Filed: Jun. 14, 1978

Related U.S. Application Data

[63] Continuation of Ser. No. 724,289, Sep. 20, 1976, abandoned.

[51] Int. Cl.[2] .................... B23P 19/04

[52] U.S. Cl. .................... 81/3 R; 29/228

[58] Field of Search .................... 27/278; 81/3 R, 3.4, 81/7.5

[56] References Cited

U.S. PATENT DOCUMENTS

| | | | |
|---|---|---|---|
| 2,717,527 | 9/1955 | Rapp | 81/7.5 |
| 3,600,982 | 8/1971 | Tholen | 81/3.4 |
| 3,748,716 | 7/1973 | Fidler | 81/7.5 X |

*Primary Examiner*—James G. Smith

*Attorney, Agent, or Firm*—Mortenson-Uebler

[57] ABSTRACT

A device useful in replacing springs in equipment such as chain saws, lawnmowers and the like having pull-rope starter assemblies is provided which device comprises a substantially cylindrical or similar member about which the old or new spring is wound and movably positioned on said member a collar capable of being moved into contact with and held against the wrapped spring to hold it in place while it is being moved to and inserted into the equipment. The surfaces of the element against which the spring is wound are substantially smooth to afford a ready sliding of the wound spring off the device into the operative position in said equipment.

4 Claims, 14 Drawing Figures

DEVICE FOR REPLACING SPRINGS

CROSS REFERENCES TO RELATED APPLICATIONS

This application is a continuation of my application Ser. No. 724,289, filed on Sept. 20, 1976 now abandoned.

PRIOR ART

Basically, the replacement of springs in lawnmowers, chain saws and similar equipment is done by hand. The repairer holds the outer end of the spring and tightly winds the spring, preventing uncoiling with his hands and fingers. With the wraps of the spring aligned so that the coil is uniform in height, the worker inserts the coil in the housing, and hooks the outer end in a slot or about a pin or the projection or slot in the housing as provided. With the outer end hooked in place, the repairer arbors the other end—that is, he secures it in a bar, shaft, spindle or about a pin or the like that is part of the starter. The assembly is then ready.

It is easily understood that this hand winding operation not only takes time but can involve mishaps. The tendency of the spring to unwind either longitudinally or to jump out of place vertically is ever present and the clearances in the housing are so slight that the worker must be ever alert and efficient. Pinched, scuffed and cut fingers and hands make the operation a frustrating one. While certain devices, as in U.S. Pat. Nos. 3,748,716 and 3,802,300 have been devised, there is need for a simple, inexpensive apparatus that allows one to do the job quickly without mishap.

Thus, an object of this invention is the provision of an apparatus which is simple, easily operated and effective in replacing springs in starter assemblies.

Another aim is the provision of a device having a small number of parts one of which affords the winding of the spring thereon and another of which affords holding it in place.

A still further purpose is providing a device which affords a ready, efficient means for replacing a spring in a starter assembly yet which has parts that are, in effect, independently movable as to each other. These and other objectives appear hereinafter.

SUMMARY OF THE INVENTION

The objects of this invention are accomplished, in one embodiment, by the provision of a hollow, cylindrical body having a height of about 2 to 5 inches and an inside diameter of about 1.0 inch to about 2.5 inches being slightly larger than the diameter of the arbor around which the spring is to be positioned. Usually the inside diameter is preferably 1.25 inches. At least one slot is cut into the wall of cylinder at one end, the cut being parallel to the long axis of the cylinder and having a width slightly greater than the thickness of the spring so that the bent or hooked end of the spring can readily be inserted therein to hold the spring during working. A flat, notched disk is provided which has a hole in its center part, the diameter of which is slightly greater than the outside diameter of the cylinder. The disk and the cylinder co-act but are not fixed to each other, so that they are readily separated and so that the disk may be moved up and down about the cylinder with ease.

The user winds the spring on the cylinder and using the disk to hold it in place he carries the apparatus with the spring on it about from place to place and easily and smoothly inserts the spring into the housing. The operation is smoothly done with minimum wear and tear of the user's fingers and hands. Since the two parts are so simple and sturdy and no gears, clutches or the like are involved, the apparatus has a long life at a low cost.

In certain equipment the clearances are greater because of the placement of clutch or other starter parts in top portions that are positioned after the replacement of the spring. For such devices, the cylinder can be replaced by a solid element about which the spring can be wound, the aforesaid slot or an equivalent thereof being present. Such a circular solid rod can be partly hollowed out at the winding end, if desired. In another embodiment, the apparatus comprises two concentric wires or bands held together by a radial wire or band or a plurality can be used, the outer wire or band affording the surfaces against which the spring is wound.

The invention will be further understood by reference to the drawings, which are given with reference to the cylindrical embodiment and given for illustration purposes only and of which FIG. 1 is a front elevation of the apparatus of this invention without a spring wound thereon;

DETAILED DESCRIPTION OF THE INVENTION

Figure 1:
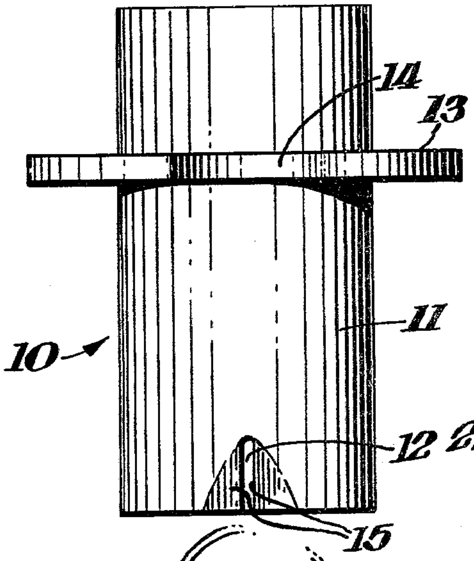

As can be seen in FIG. 1 the apparatus 10 of this invention comprises a hollow spool or cylinder 11 having at least one slot 12 therein and associated with it disk 13 having slots 14. The slots 14 are better seen in FIG. 2, a top plan view, which shows notch 12 in form of displaced or crimped end walls 15 of the notch. Such displaced walls in cut 12 are not essential, since the spring 16 (FIG. 4) normally has a hook end 17 that fits snugly into the slot, as shown in FIG. 4, holding the spring in place.

Figure 4:
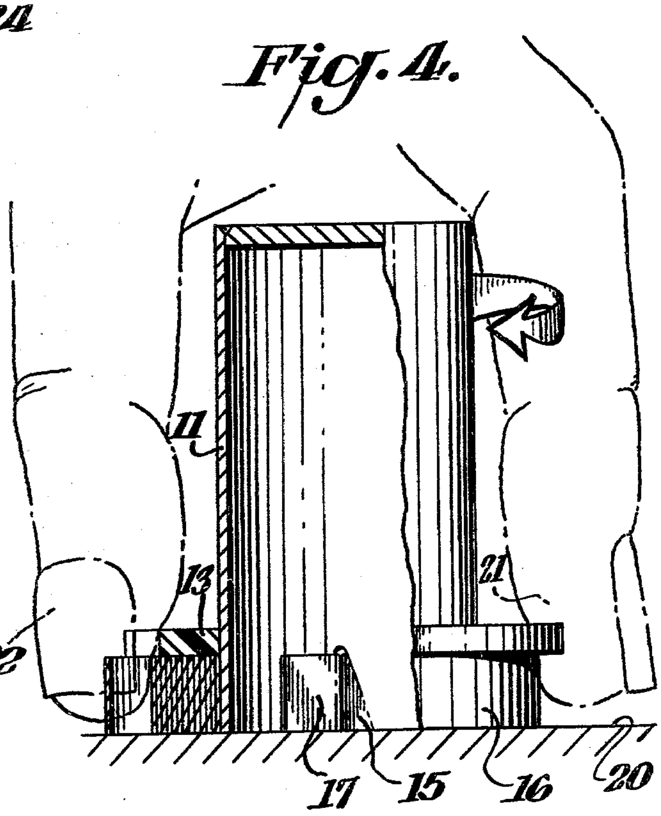
FIG. 4 is a rear elevational view with the spring being held in place, the view being partially broken away.

As can also be seen in FIG. 4, the height of cylinder 11 is such that the cupped hand of the worker can virtually contain most of the apparatus. Thus, the cylinder is usually about 2 to 5 inches in height. Greater heights can be used, since the user can surround the spool with his hand, in the manner of holding a drinking glass, and yet activate slots 13 with his fingers. However, such heights are not needed and a spool of about 3 inches in height is usually adequate and preferred. The thickness of the walls of the cylinder is immaterial just so the inside diameter is sufficient to clear most spindles or the like contained in starter assemblies. The spool may be constructed of metal, wood or plastic materials or of any similar sturdy material.

The disk 13 can be made of such materials. Generally, for ease of construction and for visability the disk is made of a transparent plastic material as, for example, a polyformaldehyde, a polyacrylate, a polyamide and the like. The center hole 24 has a diameter just slightly larger than the OD of the spool, so that the disk can be moved up and down the cylinder with ease yet is not subject to tilting or wobbling. A plurality of notches 14 are conveniently, usually symmetrically, formed on disk 13, although one would be sufficient. Such a notch, or notches, affords a place for the thumb or finger of the user and allows him to keep the wound spring in place.

Figure 2:
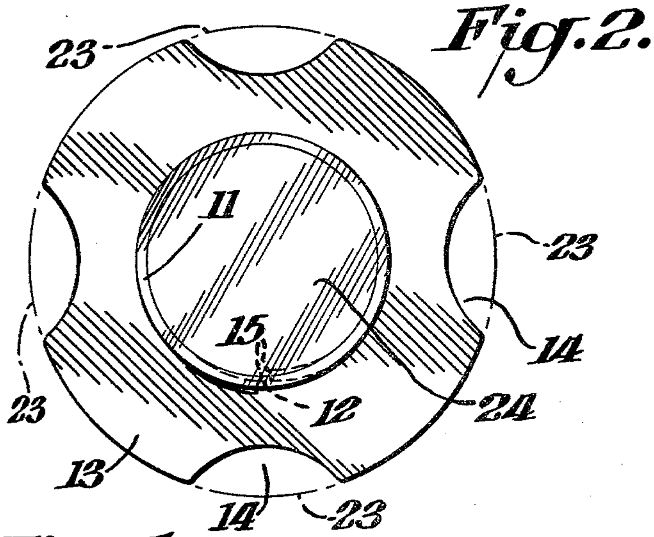
FIG. 2 is a top plan view of the disk.
Figure 3:
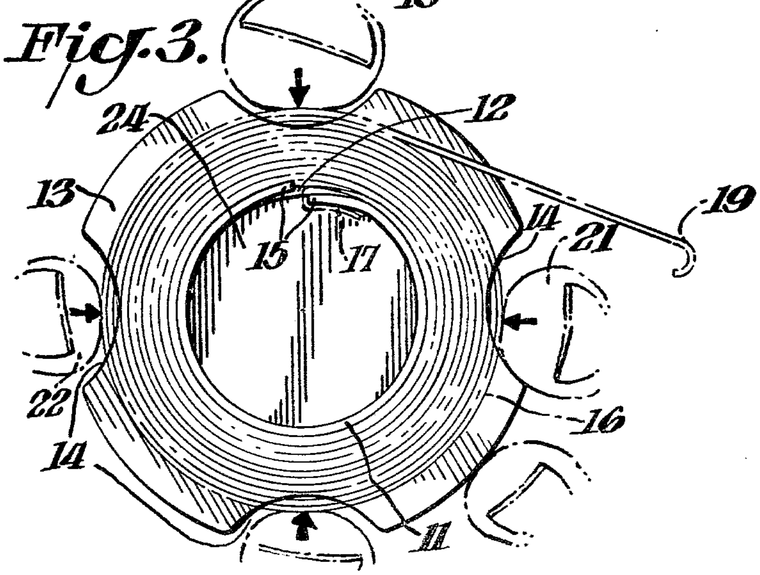
FIG. 3 is a bottom plan view of the assembly with a spring wound thereon and with repairer holding all in place, the spring being shown in phantom about the spool.

In use, the operator places the hooked inner end 18 of the spring 16 into slot 14, as shown in FIGS. 3 and 4. Then, while holding the other end 19 (FIG. 3) of the spring with the other hand, he rotates spool 11, usually with its bottom edges on a flat surface such as 20 in FIG. 4. Disk 13 is about spool 11 and during the rotation it is, of course, above spring 16, and can intermittently be brought to bear against the top edges of spring 16. Thus, a very tight and even winding is effected. With that done, the user pushes disk 13 down on the top edges of spring 16 usually with his hand cupped as shown in FIG. 4 and with his fingers, like 21 and 22, in appropriate notches and with the tips of the fingers bearing against spring 16 at their respective places. A disk free of notches, such as shown in FIG. 2 by dotted lines 23 to indicate the absence of notches 14, can be used, though such requires the user to extend his fingers over the edges of disk 13 and then inwardly to contact spring 16. Use of the unnotched disk also leads to less clearance for the user's fingers as he inserts the disk into the motor housing (not shown).

With the disk 13 pressing against spring 16 wound on spool 11 the user can pick the entirety up and move it around, turning it upside down, as in FIG. 3, if he wishes. The combination of the pressure of disk 13 on the spring 16 and the pressure of the fingers against the spring keeps the spring in place as it is moved from the flat surface 20 to the motor housing. There the user aligns the slot or retaining unit in the starter assembly that is to receive hooked end 17 with that end, and then, with the alignment effected, he merely pushes gently down on disk 13 while easing up the pressure exerted by his fingers. As a result the spring slips readily into place. The other end of the spring, end 19 (FIG. 3), is held and fixed into position as the last step.

The apparatus of this invention utilizes two uncomplicated parts that require no moving linkages between them in their use. They co-act simply and effectively. Both ends of the spring to be inserted are positioned with ease even though the spring is tightly wound. The disadvantages of hand winding and insertion without the use of tools are avoided, and troublesome, moving parts of complicated devices are not needed.

While the invention has been disclosed herein in connection with certain embodiments and certain structural and procedural details, it is clear that changes, modifications or equivalents can be used by those skilled in the art; accordingly, such changes within the principle of the invention are intended to be included within the scope of the claims below.

I claim:

1. Apparatus for use by a person in replacing a spring in a device, such as a chain saw, which apparatus comprises a cylindrical body which is hollow at one end which has an inside diameter larger than the arbor around which said spring is to be positioned;

at said end of said cylindrical body, anchor means to hold one end of said spring in place during the winding of said spring around the outer walls of said body at said end, said wall being substantially smooth to afford ready sliding of the wound spring off said body when said end of said body and said wound spring are positioned for placement of said spring about said arbor; and an element slidable on said cylindrical body which element comprises a ring-like element having an inside diameter slightly larger than the outside diameter of said cylindrical body and being freely movable to bring it into and out of operative contact with a spring wound around said outer walls of said body at its said end and when in operative contact with said spring being capable of being readily held by a hand of the user while the resultant assembly is brought into replacement position of said spring about said arbor in said device, said slidable element comprising a disk the majority of which fully covers the spring coil wound on said body but having indentations which permit fingers of said person to contact the sides of the coil to prevent it from unwinding as said person moves the coil into position for replacement.

2. Apparatus in accordance with claim 1 in which said disk is made of a plastic material.

3. Apparatus in accordance with claim 1 in which said disk is flat.

4. Apparatus in accordance with claim 1 in which said disk is transparent.

* * * * *